No. 802,358. PATENTED OCT. 17, 1905.
D. B. MERRELL.
FEED MECHANISM FOR FERTILIZER DISTRIBUTERS.
APPLICATION FILED SEPT. 10, 1904.

2 SHEETS—SHEET 1.

Inventor
Daniel B Merrell

Witnesses
Russell B Griffith
Clarence A Bateman

By Frederick F Church
his Attorney

No. 802,358. PATENTED OCT. 17, 1905.
D. B. MERRELL.
FEED MECHANISM FOR FERTILIZER DISTRIBUTERS.
APPLICATION FILED SEPT. 10, 1904.
2 SHEETS—SHEET 2.
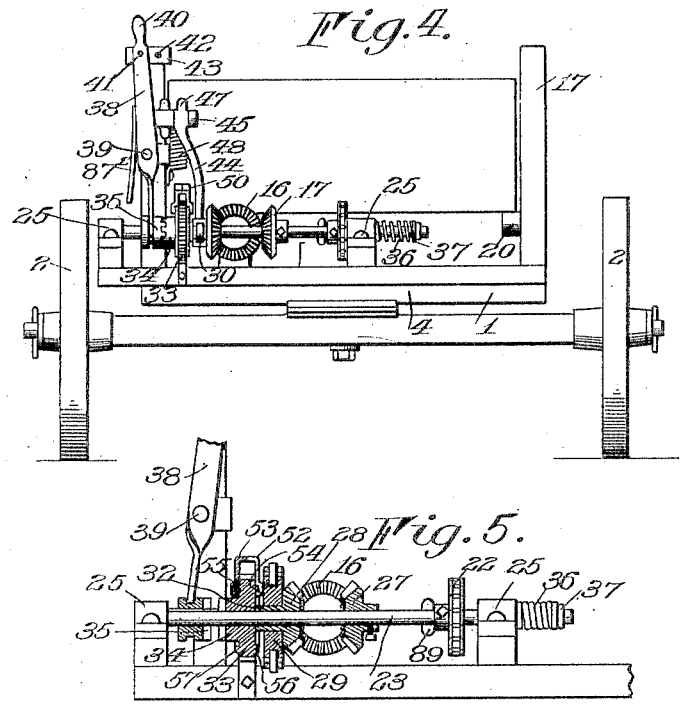
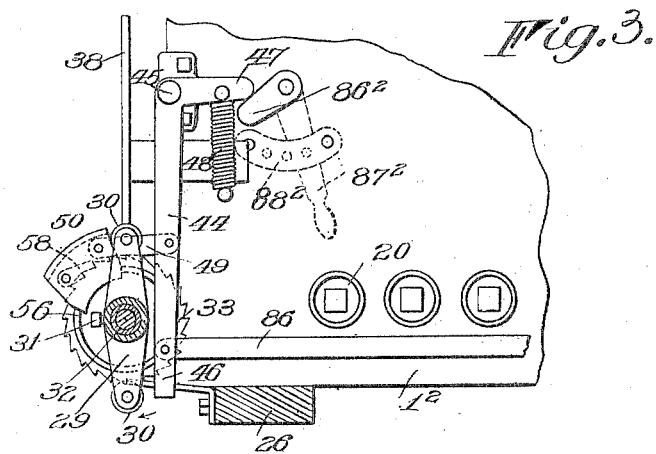
Witnesses
Russell B. Griffith
Clarence A. Bateman
Inventor
Daniel B. Merrell
By Frederick H. Church
his Attorney

UNITED STATES PATENT OFFICE.

DANIEL B. MERRELL, OF SHORTSVILLE, NEW YORK.

FEED MECHANISM FOR FERTILIZER-DISTRIBUTERS.

No. 802,358.      Specification of Letters Patent.      Patented Oct. 17, 1905.

Original application filed February 15, 1904, Serial No. 193,546. Divided and this application filed September 10, 1904. Serial No. 224,035.

*To all whom it may concern:*

Be it known that I, DANIEL B. MERRELL, of Shortsville, in the county of Ontario and State of New York, have invented certain new and useful Improvements in Feed Mechanism for Fertilizer-Distributers; and I do hereby declare the following to be a full, clear, and exact description of the same, reference being had to the accompanying drawings, forming a part of this specification, and to the reference-numerals marked thereon.

My present invention relates to improvements in fertilizer distributers or spreaders, and more especially to that class shown and described in my prior application for Letters Patent, filed February 15, 1904, Serial No. 193,546, of which this application is a division; and it has for its object to provide improved mechanism for operating the movable platform or carrier at any desired speed in order that the material may be fed to the distributer in the best manner and at an adjusted speed and for reversing its motion to return it to its original position, the arrangement being also such that the motion of the movable carrier may be automatically arrested when it reaches the limit of its motion in either the forward or the reverse direction.

My invention also consists in certain features of construction and arrangement that will hereinafter more fully appear, the novel features being more particularly pointed out in the claims hereunto annexed.

Figure 1:
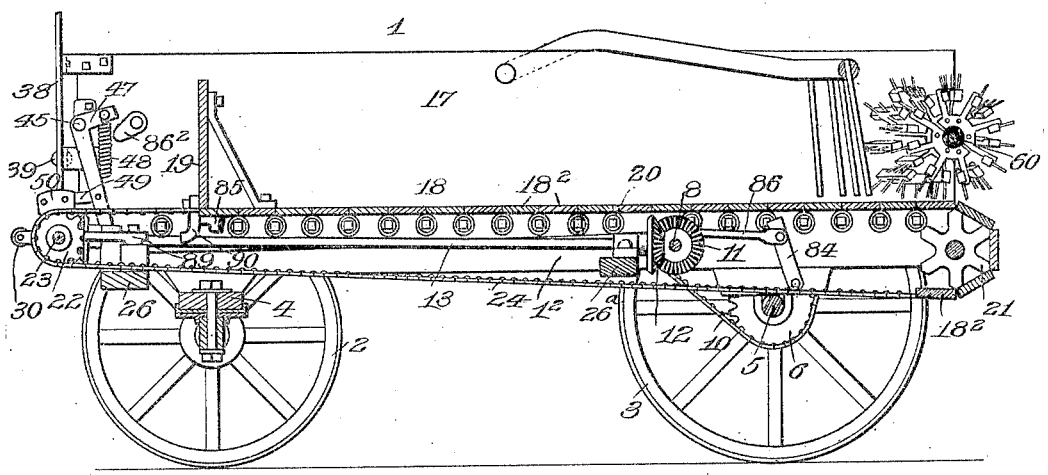
Figure 2:
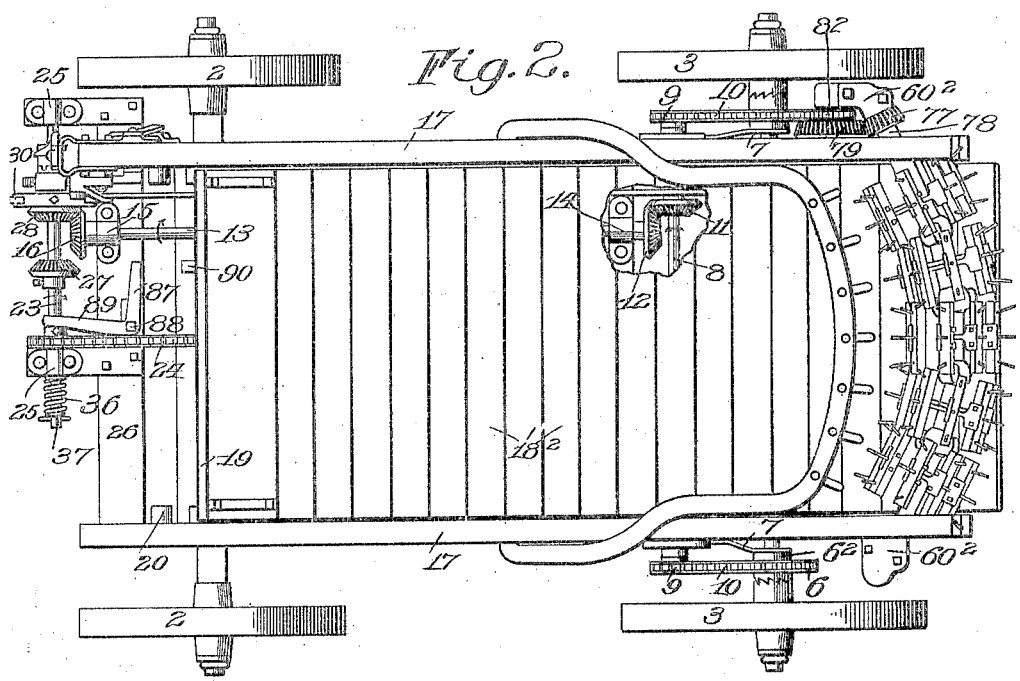

In the drawings, Figure 1 is a central longitudinal section of a distributer embodying my invention. Fig. 2 is a plan view of the same. Fig. 3 is a fragmentary sectional view showing the platform or carrier operating mechanism. Fig. 4 is a front elevation of the machine, and Fig. 5 is a detail sectional view of the carrier-operating mechanism.

In the views I have illustrated a fertilizer distributer or spreader embodying my invention, wherein—

1 designates the main frame, embodying the longitudinal sills $1^2 1^2$, mounted on the supporting-wheels 2 2 and 3 3, the forward wheels 2 2 being preferably pivoted to the bolster 4 to enable the machine to be directed in its course over the field. The rear wheels 3 3 are in the present instance mounted upon a shaft 5, upon which are loosely mounted the main driving-wheels 6 6, the surfaces of the hubs $6^2$ of each driving-wheel adjacent the supporting-wheels 3 3 being serrated to form a ratchet-clutch with the correspondingly-serrated surfaces of the hubs of the wheels 3 3, a spring 7 being provided for each clutch that will normally tend to retain it in engagement while the vehicle is moving in the forward direction, but will permit the disengagement of the clutch members when the motion is reversed. Adjacent the shaft 5 is a counter-shaft 8, mounted in the longitudinal sills $1^2 1^2$ and carrying sprocket-wheels 9 9 at each end thereof, that are connected by chains 10 10 to the main driving-wheel 6 6, and on this counter-shaft between these sills $1^2 1^2$ is also mounted a bevel-gear 11, meshing with the bevel-wheel 12, which is mounted upon a longitudinal shaft 13, that is journaled in bearings 14 15, carried by cross-pieces 26 $26^a$ on the main frame, and is provided at its opposite end with a gear-wheel 16.

The sides 17 17 of the body of the machine are relatively fixed and are preferably secured rigidly to the longitudinal sills $1^2 1^2$ of the main frame, and between these sides extends the floor of the machine, embodying a relatively movable platform or carrier 18, made up in the present instance of a plurality of sections $18^2$, that are hinged or flexibly connected to form a movable carrier, the front board 19 of the body being also connected to and movable with this flexible floor to form a follower therefor. This floor or platform is preferably mounted so as to ride upon the antifriction-rollers 20 20, that are suitably supported between the sills, and at the rear of these end sills is provided a sprocket wheel or roller 21, having its periphery so formed that the individual sections $18^2$ of the floor may pass over it, and at the forward portion of the machine is provided a sprocket-wheel 22, which is mounted upon the feed-shaft 23 and is adapted to receive a chain 24, which is connected to the forward and rear extremities of the movable floor 18. This shaft 23 is mounted in bearings 25 25, supported by the cross-piece 26, and carries the oppositely-arranged bevel-gears 27 28, respectively, the gear-wheel 27 being rigidly secured to the shaft and arranged to be moved into engagement with the bevel-gear 16, carried by the longitudinal shaft 13. The gear-wheel 28 is revolubly mounted on this shaft 23 and carries an arm 29, provided at each end with the diametrically-disposed rollers 30 30, a setscrew 21 being employed to secure this arm 29 in adjusted position upon the extension 32 of the wheel 28. Adjacent to this gear-wheel 28 is also provided a ratchet-wheel 33, which is loosely mounted on the shaft 23 and has a hub 34, the edge of which is serrated or provided with projections to form a clutch member to coöperate with the correspondingly-shaped clutch member 35, which is rigidly mounted on the shaft 23, a spring 36, interposed between the bearing 25 and the stop-collar 37 at the end of the shaft, being provided, the normal tendency of which is to retain the clutch members 34 and 35 in operative engagement. This clutch member 35 is adapted to be operated by the lever 38, pivotally mounted upon the pin 39 and having an operating-handle 40 at its upper end and in a convenient position to enable the attendant to manipulate the clutch, an aperture 41 being provided upon this lever and arranged to register with the aperture 42 upon the support 43 to permit the insertion of a pin that will retain this lever in the desired position.

Pivotally mounted upon the relatively stationary body of the machine is a bell-crank lever 44, supported by the pivot-pin 45 and having an arm 46, that is adapted to swing in a plane coincident with the plane of rotation of the arm 2, the other arm 47 having attached thereto a spring 48, the opposite end of which is relatively fixed, thereby producing a force the action of which will normally tend to move the arm 46 toward the rollers 30 30 of the rotating arm 29. A link 49 is also pivotally attached to the arm 46 of this lever and is connected at its other end to the pawl-box 50, which is preferably made up of two sections 52 and 53 suitably united, each of these sections being provided with a curved groove 54 55, respectively, in which rest the annular flanges 56 57, respectively, of the ratchet-wheel 33, such a construction permitting a circumferential motion of the pawl-box in relation to the ratchet-wheel and also serving to retain these two members in their proper relation. In the pawl-box 50 are mounted one or more ratchet-pawls 58, that are so arranged as to engage the teeth of the ratchet-wheel 33 in such a manner that as motion is imparted to the former through the link 49, that is connected to the swinging arm 46, this motion in return will be imparted to the ratchet-wheel 33 to cause a rotation of the latter, and as the clutch member 35 is normally in engagement with the corresponding member 34 of the ratchet-wheel the rotary motion of the latter will be in turn imparted to the shaft 23, causing motion to be transmitted, through the sprocket-wheel 22, to the chain 24, for a purpose that will hereinafter appear.

At the rear of the machine is mounted a feeder or distributer which may be of any desired construction, the form illustrated being that covered in my aforesaid application embodying a shaft 60, that is supported at its ends in bearings $60^2$ $60^2$ and is formed on substantially an arc of a circle that bows both rearwardly and outwardly from the rear of the machine and is made up in the present instance of a plurality of separate members connected by a suitable universal joint which will cause the motion to be transmitted between the members. These beaters are operated in the present instance by a gear-wheel 77, that is mounted on an extension 78 of the sleeve of the adjacent end beater and meshes with the gear-wheel 79, that is connected to and rotates with the sprocket-wheel 80, over which the driving-chain 10 passes, a continuous motion being thereby imparted to these beaters during the forward motion of the machine.

In order to prevent the continued operation of the movable floor or carrier after the machine has been emptied, I employ an automatic stop, which comprises in the present instance a pivoted lever 84, having an upwardly-projecting arm that is located in the path of motion of a projection 85, carried at the forward portion of the platform or floor, and it is so arranged that when it has been operated by the stop 85 it will cause the lever-arm 46 to be drawn back out of engagement with the rollers 30 30 through the connection 86, and as this lever 46 when it occupies such a position will be moved out of the path of the operating-rollers 30 30 its reciprocation will cease, thereby causing the motion of the shaft 23 and the sprocket-wheel 22 carried thereby, over which passes the chain 24, to discontinue. When the wagon-bottom or carrier has reached this position, the contents thereof will have been completely distributed, and in order to return the parts to their normal positions, the reversing-lever 38 is shifted by the attendant so as to throw the clutch member 35 out of engagement with the corresponding number 34 and at the same time draw the bevel-gear 27, that is rigidly attached to the shaft 23, into engagement with the bevel-gear 16, and as the motion of the latter continues, due to the continued motion of the machine, it will obviously impart a reverse motion to the said shaft, causing the sprocket-wheel 22 thereon to reverse the motion of the chain 24, and consequently cause the floor or carrier to return to its normal position, when the machine is in position to receive its next load.

I also employ an adjusting device whereby the relative speed with which the carrier 18 moves in relation to the speed of the machine may be regulated, and it consists in the present form in providing a movable stop $86^2$, which is adapted to coöperate with the end of the arm 47 of the lever 44 in such a manner that the return motion of the said lever under the influence of the spring 49 will be limited to various degrees at the different positions of the stop, and as the number of teeth passed over by the pawl 58 is determined by the distance of the return motion of the arm 46 the amount of movement of the ratchet-wheel 33, and consequently the operating-chain 24, connected thereto and to the movable carrier, will be varied, thereby regulating the amount of material that is fed to the beaters. In operation I prefer to employ means whereby this stop may be readily adjusted, and in the present form I employ an operating-handle $87^2$, coöperating with a graduated segment $88^2$ in such a manner that the said handle may be securely retained in its adjusted position during the operation of the machine.

In operating a machine embodying my invention any suitable means may be employed whereby it may be caused to traverse the field, and as it moves along the rear wheels 3, the hubs of which are normally held in coöperative engagement with the driving-wheels 6 6 by the spring 7 7, will impart their rotary motion to the latter wheels and the latter in turn will impart their motion to the counter-shaft 8 by means of the driving-chains 10. Assuming that the body of the machine inclosed between the sides 17 and the front board 19 and the beaters has been previously filled with the fertilizer to be distributed, it will be obvious that rotation of the counter-shaft 8 will cause a corresponding motion of the longitudinal shaft 13 through the bevel-gears 11 and 12, and the rotary motion of this shaft 13 will in turn be transmitted from the bevel-gear 16 to the corresponding wheel 28. This bevel-gear 28 is revolubly mounted on the shaft 23, and as it rotates the rollers 30 30, carried by the arm 29, that are attached to this bevel-gear 28, will be caused to move in a circular path, and in doing so they will strike successively against the arm 46 of the lever 44, causing it to be displaced rearwardly, and as this arm 46 moves rearwardly under the action of these rollers the pawl-box 50, carrying the pawl 58, that normally rests in engagement with the ratchet-wheel 33, will be drawn backwardly by the link 49, thereby causing the feed-shaft 23, which is connected to this wheel through the clutch members 34 and 35, to be rotated a predetermined amount. As each roller leaves this lever the latter will be immediately returned to its normal position under the action of the spring 48 in readiness to be actuated in a similar manner by the next succeeding roller, and during its return motion the pawl 58 will ride over a predetermined number of the ratchet-teeth. The amount of motion thus imparted to the shaft 23 may be varied by adjusting the stop $86^2$ through the manipulation of the lever $87^2$, as it will be seen that by bringing this adjustable stop $86^2$ into different positions, so as to limit the return motion of the arm 46 under the action of the spring 48, a lesser number of teeth will be traversed by the pawl 58 in its return motion, thereby decreasing the distance through which the ratchet-wheel rotates. The motion thus imparted to the shaft 23 will cause an intermittent motion of the sprocket-wheel 22 in the direction of the arrow, causing the chain 24, which is connected to the rear of the movable platform, to draw the latter rearwardly, and as the front board 19 moves with this platform as a follower it will cause the material thereon to be positively fed rearwardly against the forks 82, raising the latter and pressing beneath them and onto the beaters. One of the driving-chains 10 preferably passes over suitable devices for transmitting motion to the beaters for operating them in a manner that will be readily understood. As the machine is drawn over the field the distribution will continue until the follower 19 has reached the limit of its rearward motion and caused the entire contents to be exhausted, at which time the projection 85 will have struck the lever 84, causing it and the link 86, connected to it, to move rearwardly, such an operation causing the arm 46 to be drawn back out of the path of the rollers 30, consequently causing the feeding operation to cease. When this has occurred, the reversing-lever 38 may be shifted so as to throw the clutch member 35 out of engagement with the corresponding member 34 and at the same time shifting the shaft 23 longitudinally against the action of the spring 36 and also bringing the bevel-gear 27 into engagement with the corresponding gear 16. Continued motion of the machine will then cause the shaft 23 to be rotated in a reverse direction, the sprocket-wheel 22 in turn reversing the motion of the chain 24 and causing the movable platform to be drawn forwardly into its normal position, when the machine is ready to be refilled for the next succeeding distribution. In order that the return motion of the floor or platform may also be automatically arrested when it has reached its limit of motion, I provide a stop embodying in the present instance a bell-crank lever 87, pivotally mounted upon the pin 88, carried by the cross-piece 26, and having an arm 89, adapted to engage the sprocket-wheel 22 or other suitable projection upon the feed-shaft 22 to move it longitudinally, and thereby disengage the reverse-gear 27 and the gear 16, the other arm of this lever normally resting in the path of the projection 90, that is carried by the relatively movable floor or platform, whereby when the latter reaches the limit of its forward motion the said projection will strike the corresponding arm of the bell-crank lever, causing the opposite arm in turn to strike the wheel 22, and thereby move the shaft 23 longitudinally.

A machine embodying my invention enables the speed by which the material is fed to the beaters to be readily adjusted to meet the requirements of various conditions, and it also provides an automatic device that will cause this feeding operation to be discontinued at the proper moment when the material has been exhausted. It also provides a convenient and simple means for reversing the motion of the moving platform and for bringing the latter to a stop when it reaches the limit of its forward motion, so that this operation may be automatically accomplished through the continued motion of the machine along the ground, thereby avoiding the necessity of performing this operation manually or by other separately-operable means.

I claim as my invention—

1. In a distributer, the combination with the body thereof carrying the relatively movable floor or carrier, of a longitudinally-movable feed-shaft operatively connected to the carrier, mechanism connected to the feed-shaft for operating the latter in relatively forward and reverse directions and a power-shaft capable of being connected with the forward or reverse mechanism through the longitudinal motion of the feed-shaft.

2. In a distributer, the combination with the body thereof carrying the relatively movable floor or carrier, of a longitudinally-movable feed-shaft operatively connected to the carrier, oppositely-arranged power-transmitting devices mounted upon the feed-shaft, and a power-shaft capable of coöperating alternately with the power-transmitting devices of the feed-shaft to operate the latter in a relatively forward or reverse direction when the said feed-shaft is operated longitudinally.

3. In a distributer of the character described, the combination with the body thereof carrying the relatively movable floor or carrier, of a feed-shaft operatively connected to the carrier and capable of a longitudinal motion, forward and reverse mechanism carried by said shaft, a power-shaft adapted to be connected alternately with the forward and reverse mechanisms of the shaft, a clutch movable with the feed-shaft and adapted to communicate motion between the latter and the forward operating mechanism and means for shifting the feed-shaft longitudinally to disengage the clutch and forward operating mechanism and simultaneously connect the reverse mechanism and the power-shaft.

4. In a distributer, the combination with the body thereof carrying the relatively movable floor or carrier, of a feed-shaft operatively connected to the carrier and capable of a longitudinal motion, forward and reverse operating mechanism carried by the feed-shaft, a power-shaft adapted to be connected to the forward and reverse mechanism of the feed-shaft by the longitudinal motion of the latter, and a stop coöperating with the carrier for automatically shifting the feed-shaft longitudinally to disconnect the reverse mechanism and the power-shaft.

5. In a distributer, the combination with the body thereof carrying the relatively movable floor, of a feed-shaft operatively connected to the floor and capable of longitudinal motion, a reverse-gear rigidly mounted thereon, and a forward operating-gear loosely mounted on the feed-shaft and carrying an actuating device, a power-shaft adapted to be connected to the forward and reverse gears of the feed-shaft, a clutch interposed between the forward operating-gear and the feed-shaft for transmitting motion from the former to the latter, and means for shifting the feed-shaft longitudinally to disconnect the clutch and forward gear and simultaneously connect the reverse-gear and power-shaft.

6. In a distributer, the combination with the body thereof carrying the relatively movable floor, of feed devices for operating the floor embodying a feed-shaft operatively connected to the said floor and carrying a toothed wheel, a pivoted arm operatively connected to a pawl coöperating with said wheel, an actuating device coöperating with said arm for operating the pawl, and a device operated by the movement of the floor for disengaging the actuating device and the arm.

7. In a distributer, the combination with the body portion thereof carrying the relatively movable floor and a spreader to which the material is fed by said floor, of feed devices for operating the latter embodying a feed-shaft operatively connected to the floor, and an operating-shaft connected to suitable driving mechanism, an actuating device rotated by the operating-shaft and mounted on the feed-shaft, and pawl-and-ratchet mechanism operated by said actuating mechanism for imparting motion to the feed-shaft.

8. In a distributer, the combination with the body thereof carrying the movable floor or carrier, of feed devices for operating the latter embodying a feed-shaft operatively connected thereto and carrying ratchet-and-pawl mechanism, an operating-shaft, and an actuating device embodying an arm revolubly mounted upon the feed-shaft and driven by the operating-shaft and having the rollers in the ends thereof coöperating with the ratchet-and-pawl mechanism for imparting motion to the feed-shaft.

9. In a distributer, the combination with the body thereof carrying the relatively movable floor or carrier, of feed devices for operating the latter embodying an operating-shaft, ratchet-and-pawl mechanism operatively connected to the movable floor for imparting motion thereto, an actuating device operated by the said shaft, an arm capable of being moved into and out of coöperative relation with said device and arranged to actuate the ratchet-and-pawl mechanism, and a device for automatically disengaging the arm and actuating device when the carrier reaches a predetermined position.

10. In a distributer, the combination with the body of the vehicle and a relatively movable floor or carrier carried thereby, of feeding devices for operating the floor embodying a feed-shaft operatively connected to the latter and carrying a ratchet-wheel, a pawl coöperating with the teeth of the ratchet for operating the latter, a movable arm carrying the pawl, an actuating device carried by the feed-shaft for operating the arm and a spring operating to retain the said movable arm in coöperative relation with the actuating device.

11. In a distributer, the combination with the frame or body of the vehicle, carrying a relatively movable floor or carrier, of feed devices for operating the floor embodying a feed-shaft operatively connected to the floor or carrier and carrying a toothed wheel, a pawl coöperating with the teeth upon said wheel for operating the shaft, an adjustable stop for varying the travel of said pawl, and an actuating device for imparting motion to the said pawl.

12. The combination with the vehicle-body carrying a relatively movable floor or carrier, of feed devices for operating the latter embodying a feed-shaft operatively connected to the movable floor and carrying a toothed wheel, a pawl coöperating with said toothed wheel for imparting motion to the latter, a movable member connected to said pawl for imparting motion thereto, an adjustable stop for limiting the motion of said movable member, and an actuating device for the latter.

13. The combination with the distributer-body carrying the relatively movable floor or carrier, of feed devices for operating the latter embodying a feed-shaft operatively connected to the movable floor and carrying a toothed wheel, a movable member carrying a pawl coöperating with the toothed wheel for imparting motion from the former to the latter, an actuating device mounted on the feed-shaft and embodying a rotating arm having portions arranged to successively engage said movable member to impart motion thereto, and means for operating said actuating device.

14. The combination with the distributer-body carrying a relatively movable floor or carrier, of feed mechanism for operating the latter embodying a feed-shaft operatively connected to the floor or carrier and carrying a toothed wheel, a movable member carrying a pawl coöperating with the said wheel for imparting rotary motion to the latter, an adjustable stop for limiting the motion of said movable member, and an actuating device carried by the feed-shaft for operating said movable member.

15. The combination with the distributer-body carrying the movable floor or carrier, of operating mechanism for the latter embodying a longitudinally-movable feed-shaft operatively connected to said floor or carrier and carrying forward and reverse gear-wheels, an operating-shaft having a corresponding wheel adapted to mesh with the said wheels of the feed-shaft, a clutch through which motion imparted to the forward gear is transmitted to the shaft, and a shifting device operating said shaft for disconnecting the clutch and bringing the reverse-gear into coöperation with the wheel of the operating-shaft.

16. The combination with the distributer-body carrying the relatively movable carrier, of a feed device operatively connected to the carrier and provided with a toothed wheel, a movable member carrying a pawl coöperating with the toothed wheel for imparting motion to the feed device, an actuating device for said movable member and a stop connected to the latter and arranged in the path of a projection on said carrier for disengaging said member from the actuating device.

17. The combination with the distributer-body carrying the movable carrier, of feed mechanism for operating the latter embodying an operating-shaft, a longitudinally-movable feed-shaft operatively connected to the carrier, devices interposed between the operating and feed shafts for transmitting motion to the latter for advancing the carrier, reverse mechanism carried by the feed-shaft adapted to be moved into operative position with the operating-shaft to reverse the motion of the feed-shaft and cause the return motion of the carrier, and a stop coöperating with the carrier during its return motion to operate the feed-shaft longitudinally to disconnect the reverse mechanism.

18. The combination with the distributer-body carrying the movable carrier, of feed mechanism for operating the latter embodying an operating-shaft, a longitudinally-movable feed-shaft operatively connected to the carrier and carrying forward and reverse gear adapted to be thrown into operation successively with the operating-shaft, a clutch movable with the feed-shaft for connecting and disconnecting the forward operating-gear with the feed-shaft, and means operating said shaft for simultaneously disconnecting the clutch to interrupt the forward motion of the feed-shaft, and setting into operation the reverse mechanism to cause the return motion of the carrier.

19. The combination with distributer-body carrying the relatively movable carrier, of feed devices embodying a feed-shaft operatively connected to the carrier and carrying forward and reverse gears mounted loosely and tightly, respectively thereon, a toothed wheel also loosely mounted on the feed-shaft, a movable member carrying a pawl coöperating with the toothed wheel for rotating it, an actuating device carried by the loose forward gear and actuating said movable member, a clutch member tightly mounted on the feed-shaft and cooperating with the toothed wheel for locking the latter to the shaft, and means for manipulating the said clutch member for shifting the feed-shaft longitudinally to disengage the clutch member from the toothed wheel, and bring the reverse-gear into operation with the operating-shaft.

20. In a distributer the combination with the body thereof carrying the relatively movable floor or carrier, of a feed-shaft arranged transversely of the body of the distributer and operatively connected to the carrier, a power-shaft adapted to be operatively connected to the feed-shaft and arranged longitudinally of the said body, motion-transmitting devices on the power and feed shafts arranged to be connected by a motion longitudinally of the feed-shaft, and a transversely-arranged counter-shaft operatively connected to the longitudinally-arranged shaft.

21. In a distributer, the combination with the body thereof carrying the relatively movable floor or carrier, and the driving-wheels having the independently-arranged driving devices for each of said wheels, of a feed-shaft operatively connected to the carrier and arranged transversely of the body of the distributer, a power-shaft arranged longitudinally of the said body and adapted to coöperate with the feed-shaft, a counter-shaft arranged transversely of the said body and coöperating with the longitudinal power-shaft, and means connecting the counter-shaft with the driving devices of each wheel.

22. In a distributer, the combination with the body thereof carrying the relatively movable floor or carrier, of a feed-shaft operatively connected to the carrier and having a pair of oppositely-arranged bevel-gears mounted thereon, and a power-shaft having a gear adapted to coöperate alternately with those of the feed-shaft.

23. In a distributer, the combination with the body thereof carrying the relatively movable floor or carrier, of a feed-shaft operatively connected to the carrier, oppositely-arranged power-transmitting devices mounted on the feed-shaft, one of said devices being connected to the said shaft through intermediate speed-reducing devices and the other being connected directly to the shaft, and a power-shaft arranged to coöperate alternately with the power-transmitting devices of the feed-shaft for operating the latter and the carrier in relatively forward and reverse direction.

DANIEL B. MERRELL.

Witnesses:
CARL E. DORR,
CHAS. A. HARGITT.